US011472329B2

(12) United States Patent
Fleece

(10) Patent No.: US 11,472,329 B2
(45) Date of Patent: Oct. 18, 2022

(54) CONTROL MODULE ASSEMBLY FOR CONTROLLING LIGHTS ON A MOTORIZED VEHICLE

(71) Applicant: Fleece Performance Engineering, Inc., Pittsboro, IN (US)

(72) Inventor: Brayden Fleece, Pittsboro, IN (US)

(73) Assignee: FLEECE PERFORMANCE ENGINEERING, INC., Pittsboro, IN (US)

( * ) Notice: Subject to any disclaimer, the term of this patent is extended or adjusted under 35 U.S.C. 154(b) by 13 days.

(21) Appl. No.: 17/126,181

(22) Filed: Dec. 18, 2020

(65) Prior Publication Data
US 2021/0188156 A1 Jun. 24, 2021

Related U.S. Application Data

(60) Provisional application No. 62/949,652, filed on Dec. 18, 2019.

(51) Int. Cl.
*B60Q 1/00* (2006.01)
*B60Q 1/04* (2006.01)
(52) U.S. Cl.
CPC .......... *B60Q 1/0088* (2013.01); *B60Q 1/04* (2013.01)
(58) Field of Classification Search
CPC ...... B60Q 1/0088; B60Q 1/04; B60Q 1/1407; B60Q 1/20; B60Q 2900/10
See application file for complete search history.

(56) References Cited

U.S. PATENT DOCUMENTS 6,254,436 B1 * 7/2001 Nitta ................... B60Q 1/0088
439/850
7,945,769 B2 5/2011 Hong et al.
8,498,121 B2 7/2013 King et al.
8,880,817 B2 11/2014 Krishnan et al.

FOREIGN PATENT DOCUMENTS

EP 2266845 A1 * 12/2010 ........... B60Q 1/0088

* cited by examiner

*Primary Examiner* — Renan Luque
(74) *Attorney, Agent, or Firm* — Taft Stettinius & Hollister LLP; Stephen F. Rost

(57) ABSTRACT

A multi-light control module assembly for controlling multiple lamps on a motorized vehicle includes a circuit board module having a first end, a second end, a first side, and a second side. The board has a length defined between the first end and the second end and a width defined between the first side and the second side. A diode assembly is coupled to the module towards the second end thereof, and a connector assembly is coupled to the module adjacent to the diode assembly. The connector assembly is electrically coupled to the diode assembly. A first channel is defined between a first arm and a main portion of the module, and a second channel defined between a second arm and the main portion of the module. A cap is removably coupled to the connector assembly configured for partially housing a pair of wires receiving in the connector assembly.

20 Claims, 7 Drawing Sheets

CONTROL MODULE ASSEMBLY FOR CONTROLLING LIGHTS ON A MOTORIZED VEHICLE

RELATED APPLICATIONS

The present application claims the benefit of U.S. Provisional Patent Application Ser. No. 62/949,652, filed Dec. 18, 2020, the disclosure of which is hereby incorporated by reference in its entirety.

FIELD OF THE DISCLOSURE

The present disclosure relates to controlling two or more lights on a motorized vehicle, and more particularly to a control module assembly for controlling the two or more lights simultaneously.

BACKGROUND

Motorized vehicles often include front headlamps that illuminate at dusk or night when it becomes difficult to see. The headlamps are capable of being set to a low beam setting or a high beam setting. When it is foggy while operating the vehicle, the vehicle may include fog lamps to illuminate the road ahead to allow the driver to better see when it is otherwise difficult to do so. In a conventional arrangement, an operator can only turn the fog lamps on when the low beams are enabled. Thus, there is a need for an operator to be able to turn on the fog lamp when the high beams are enabled.

SUMMARY

In a first embodiment of the present disclosure, a multi-light control module assembly for controlling multiple lamps on a motorized vehicle includes a circuit board module comprising a first end, a second end, a first side, and a second side, where the board comprises a length defined between the first end and the second end and a width defined between the first side and the second side; a diode assembly coupled to the module at a location generally towards the second end thereof; a connector assembly coupled to the module adjacent to the diode assembly, the connector assembly being electrically coupled to the diode assembly; a first channel defined between a first arm and a main portion of the module; a second channel defined between a second arm and the main portion of the module; and a cap removably coupled to the connector assembly configured for partially housing a pair of wires receiving in the connector assembly; wherein, the connector assembly comprises a first wire receiver and a second wire receiver, the first wire receiver including at least one wire guide and the second wire receiver including at least one wire guide; wherein, the first wire receiver comprises a first wire stripper and the second wire receiver comprises a second wire stripper.

In a first example of this embodiment, the first channel is located adjacent to the first side and the second channel is located adjacent to the second side. In a second example, neither the first channel or second channel is formed in either the first end or second end of the module. In a third example, each of the first and second channels comprises a substantially angled portion and a substantially straight portion. In a fourth example, the substantially angled portion is formed in the respective first or second side.

In a fifth example, the length of the module is defined along a longitudinal axis; the first channel comprises a first portion angled relative to the longitudinal axis at a first angle; the second channel comprises a second portion angled relative to the longitudinal axis at a second angle, where the second angle is about the same as the first angle. In a sixth example, the first arm is formed at the first side of the module and the second arm is formed at the second side thereof. In another example, the module comprises a thickness which is less than the length and width. In a further example, circuitry electrically couples the connector assembly and the diode assembly to one another.

In another embodiment of the present disclosure, a control module assembly for controlling two or more lamps on a motorized vehicle includes a circuit board module comprising a first end, a second end, a first side, and a second side; a diode assembly coupled to the module towards the second end thereof; a connector assembly coupled to the module; a first channel defined between a first arm and a main portion of the module; a second channel defined between a second arm and the main portion of the module; and circuitry coupled to the module at least partially between the connector assembly and the diode assembly, the circuitry electrically coupling the connector assembly to the diode assembly; wherein, the connector assembly comprises a wire receiver including at least one wire guide; wherein, the at least one wire guide is formed via a wire stripper.

In one example of this embodiment, a cap is removably coupled to the connector assembly configured for partially housing one or more wires received by the connector assembly. In a second example, the first channel is located adjacent to the first side and the second channel is located adjacent to the second side. In a third example, each of the first and second channels comprises a substantially angled portion and a substantially straight portion.

In a fourth example, the length of the module is defined along a longitudinal axis; the first channel comprises a first portion angled relative to the longitudinal axis at a first angle; the second channel comprises a second portion angled relative to the longitudinal axis at a second angle, where the second angle is about the same as the first angle. In a fifth example, the first arm is formed at the first side of the module and the second arm is formed at the second side thereof.

In a further embodiment of the present disclosure, a motorized vehicle includes a chassis; a plurality of wheels for supporting the chassis; a vehicle lighting system comprising at least one headlamp and at least one fog lamp, where the at least one headlamp is configured to emit a high light beam, a low light beam, or both, and the at least one fog lamp is configured to emit a fog light beam; a first wire disposed in communication with the at least one headlamp; a second wire disposed in communication with the at least one fog lamp; and a control module assembly for controlling the at least one headlamp and the at least one fog lamp simultaneously, the control module assembly including a circuit board module comprising a first end, a second end, a first side, and a second side; a diode assembly coupled to the module; a connector assembly coupled to the module adjacent to the diode assembly, the connector assembly being electrically coupled to the diode assembly; a first channel defined between a first arm and a main portion of the module; a second channel defined between a second arm and the main portion of the module; and a cap removably coupled to the connector assembly for partially housing the first and second wires in the connector assembly; wherein, the connector assembly comprises a first wire receiver and a second wire receiver, the first wire receiver including at least one wire guide and the second wire receiver including at least one wire guide; wherein, the first wire is received by the first wire receiver and the second wire is received by the second wire receiver.

In one example of this embodiment, the first wire receiver comprises a first wire stripper and the second wire receiver comprises a second wire stripper, the first wire stripper partially cutting through an outer layer of the first wire and the second wire stripper partially cutting through an outer layer of the second wire. In another example, the control module is coupled to a wiring harness which controls one or more relays in a fuse box located on the vehicle. In a further example, the vehicle includes circuitry electrically coupling the connector assembly and the diode assembly to one another, the circuitry comprising a first wire circuit and a second wire circuit; wherein, when the first wire is located in the first wire receiver, the first wire circuit electrically couples the diode assembly to the first wire; wherein, when the second wire is located in the second wire receiver, the second wire circuit electrically couples the diode assembly to the second wire. In yet a further example, as the cap is coupled to the connector assembly with the first wire located in the first wire receiver and the second wire located in the second wire receiver, the cap forces the wires into contact with wire strippers for removing at least a portion of an outer layer of the first and second wires.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
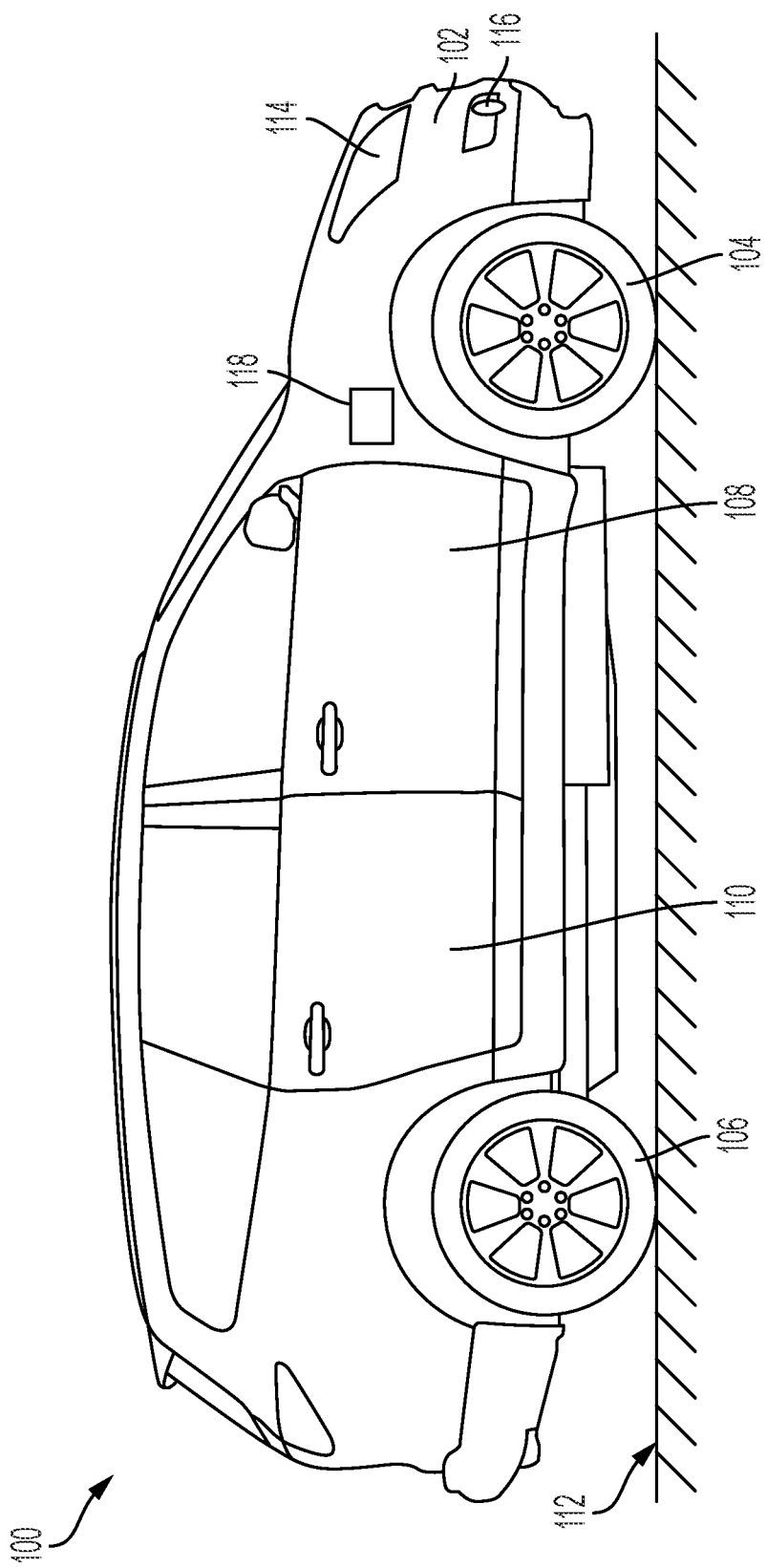
FIG. 1 illustrates a side view of a motorized vehicle.

FIG. 1 illustrates an embodiment of a motorized vehicle 100. As shown in FIG. 1, the vehicle 100 may include a vehicle body or chassis 102 operatively coupled to front wheels 104 and rear wheels 106 which support the vehicle 100 as it traverses the ground 112. As shown, a first or front passenger side door 108 is located between the front wheels 104 and rear wheels 106 and provides access to a passenger for sitting in a front seat of the vehicle 100 adjacent to the driver. The vehicle 100 of FIG. 1 may include a second passenger side door 110 coupled to the body or chassis 102 thereof.

The vehicle 100 may include a pair of headlamps 114 electrically operated and positioned in pairs, one or two on each side of the front of the vehicle 100. The headlamp system of the vehicle may produce a low and a high beam, which is generally produced by multiple pairs of single-beam lamps or by a pair of dual-beam lamps, or a combination thereof. High beams cast most of their light straight ahead, maximizing seeing distance but often producing too much glare for safe use when other vehicles are present on the road. Because there is no special control of upward light, it can be particularly difficult to see using high beams when fog, rain and snow are present due to the retro-reflection of the water droplets. Low beams, on the other hand, can have stricter control of upward light, and direct most of their light downward and either rightward or leftward to provide forward visibility without excessive glare.

The vehicle 100 may also be equipped with one or more fog lamps or lights 116 as shown. The headlamp system and fog lamps may be part of an overall vehicle lighting system. As is known, the difference between high beams from the headlamps 114 and the fog lights 116 is generally the direction the light is directed. In fog, this light is directed directly back at the driver so an opaque reflection is seen. Further, fog lights direct the light low and down so the objects in front of the driver are illuminated rather than the fog. To operate or control the headlamp system and/or fog lamps, an operator may actuate a switch or control in the cab of the vehicle to turn on or off the respective lamp. A controller (not shown) may be in electrical communication with the control such that as the operator makes a selection, the controller receives the command from the control. In turn, the controller may turn on or off the desired lamp via an electrical communication sent via one or more wires to the lamps, as is known in the art. Other communication protocols may be used for controlling the different lamps.

Figure 2:
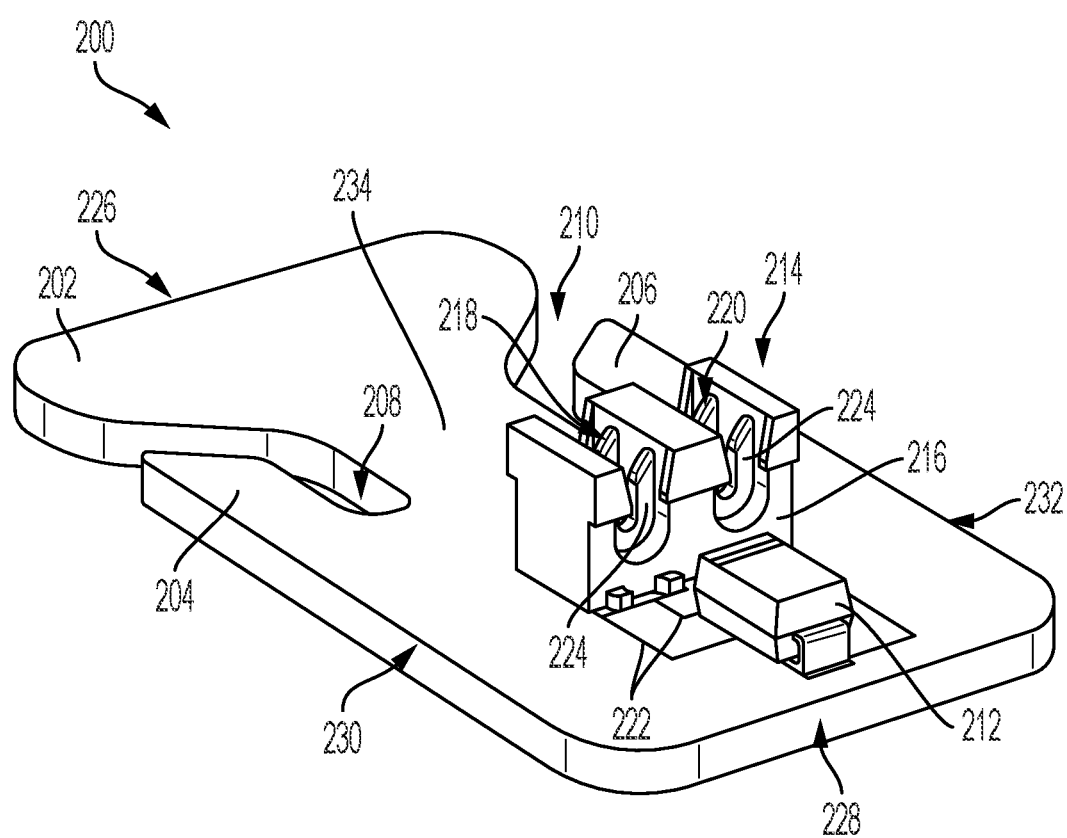
FIG. 2 illustrates a perspective view of an embodiment of a control module assembly of the present disclosure.
Figure 3:
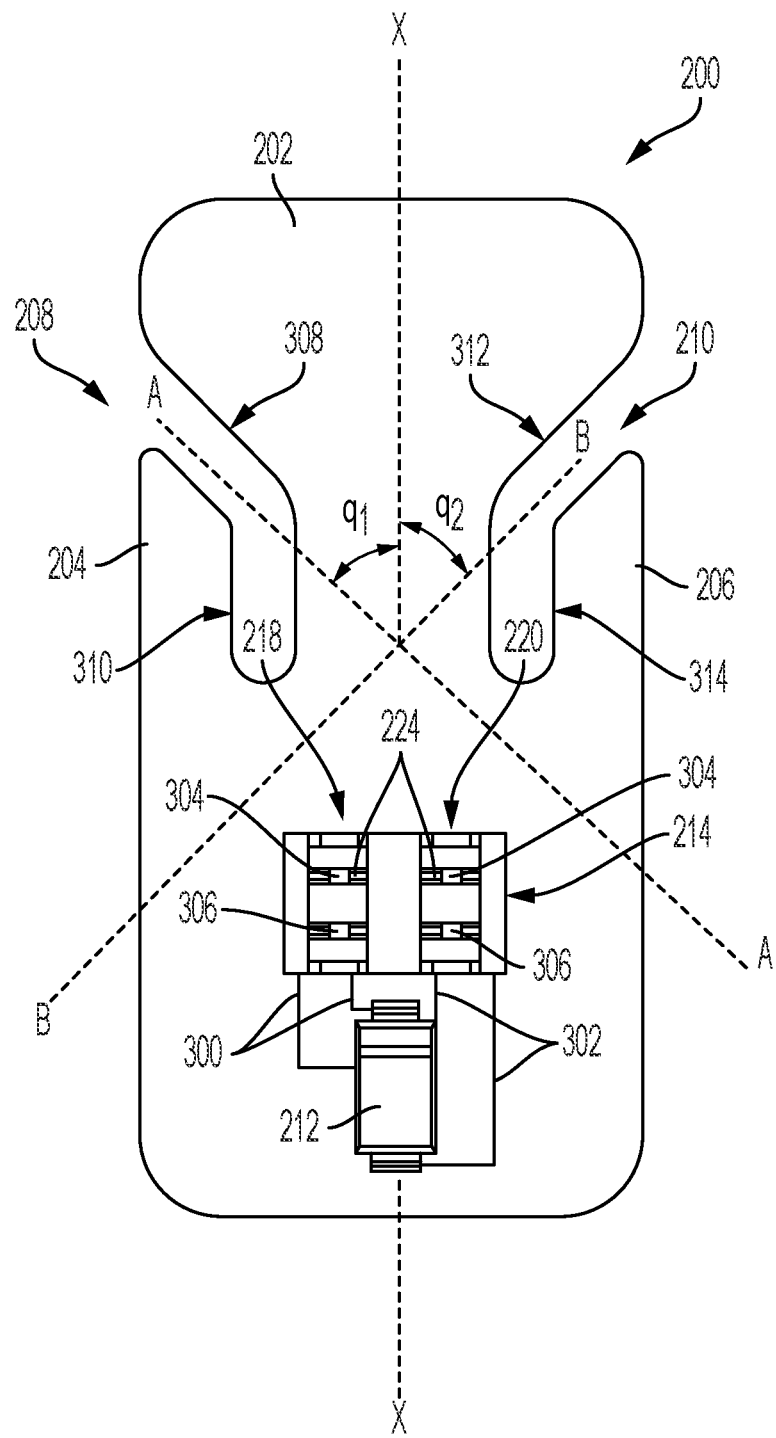
FIG. 3 illustrates a top view of the assembly of FIG. 2.

In some instances, a driver may want to further illuminate the road ahead by allowing the high beams, low beams and fog lamps to simultaneously be activated. In most conventional vehicles, this option is unavailable. Referring to FIGS. 2 and 3, however, a solution to this is shown. Here, a control module assembly 200 in the form of a circuit board module 202 may be provided. The control module assembly 200 may be disposed in electrical control of the different lamps on the vehicle 100. The module 202 may be substantially rectangularly-shaped and generally thin. Further, the module 202 may comprise a board or body having a first end 226, a second end 228, a first side 230, and a second side 232. The first end 226 may be located at an opposite end of the module 202 from the second end 228. Likewise, the first side 230 may be located on an opposite side of the module 202 from the second side 232. In this embodiment, each of the length defined between the first and second ends and the width defined between the first and second sides is greater than the thickness of the module 202.

The module 202, however, may include a pair of channels defined therein formed by a pair of arms on each side thereof. In FIG. 2, for example, the module 202 includes a main portion 234 partially separated from a first arm 204 and a second arm 206. A first channel 208 is defined in the module 202 between the first arm 204 and the main portion 234, and a second channel 210 is defined in the module 202 between the second arm 206 and the main portion 234. The first arm 204 is generally located on the first side 230 of the module 202, and the second arm 206 is generally located on the second side 232 thereof. The first and second channels, as will be described further below, may have a width for receiving a wire which controls one of the lamps on the vehicle.

The control module assembly 200 may include a diode assembly 212 generally located at the second end 228 of the module 202 opposite from the first and second channels. The diode assembly 212 may be any conventional diode as known to one skilled in the art.

The control module assembly 200 may also include a connector assembly 214, as shown in FIGS. 2 and 3. The connector assembly 214 may be located generally towards the second end 228 of the module 202. The connector assembly 214 may be centered relative to the first and second sides, although in a different embodiment the assembly may be located closer to either side. Further, the connector assembly 214 may be a board-mounted insulation displacement connector along with wire guides 304, 306 to manage and retain the wires. The wire guides 304, 306 may include a wire cutter or stripper that may cut or strip the outer layer of the wire to electrically connect each wire to the diode assembly 212. The connector assembly 214 includes a body 216 and a first wire receiver 218 and a second wire receiver 220 each capable of receiving and retaining a different wire. Once coupled, the connector assembly 214 is electrically connected to the diode assembly 212 via circuitry 222. The circuitry 222 may include one or more circuits through which electricity may flow between the connector assembly 214 and the diode assembly 212. In FIG. 3, for example, a first wire circuitry 300 and a second wire circuitry 302 may be provided such that the first wire circuitry 300 is configured to electrically couple a first wire (not shown) received in the first wire receiver 218 to the diode assembly 212, and the second wire circuitry 302 is configured to electrically couple a second wire (not shown) received in the second wire receiver 220 to the diode assembly 212.

The aforementioned first and second channels formed in the module board 202 may be shaped for receiving and securely holding the first and second wires. In FIG. 3, for example, the first channel 208 may include a first portion 308 and a second portion 310. Likewise, the second channel 210 may include a first portion 312 and a second portion 314. The first portions 308, 312 may be angled relative to a longitudinal axis X that passes through a center portion of the module board 202. In one example, the first portion 308 may be angled relative to the axis X by a first angle $\Theta_1$ and the first portion 312 may be angled relative to the axis X by a second angle $\Theta_2$. In one embodiment, the first angle $\Theta_1$ and the second angle $\Theta_2$ may be approximately the same. In a second embodiment, the two angles may be within 5° of one another. In a third embodiment, the two angles may be within 10° of one another. In a fourth embodiment, the two angles may be within 15° of one another. In a fifth embodiment, the two angles may be within 30° of one another.

The second portion 310 of the first channel 208 may be substantially straight. As shown, the second portion 310 may be substantially parallel but offset from the longitudinal axis X. Similarly, the second portion 314 of the second channel 210 may be substantially straight. In the same way, the second portion 314 may be substantially parallel but offset from the longitudinal axis X. In one example, the second portion 310 of the first channel 208 may be offset from the axis X by approximately the same amount as the second portion 314 of the second channel 210. In another example, however, the second portions may be offset from the axis by different amounts.

While FIGS. 2 and 3 represent one example of the first channel 208 and second channel 210, it is contemplated within this disclosure that the pair of channels may include various paths. For example, either or both of the first and second channels may comprise a substantially straight channel which is substantially parallel to the longitudinal axis X. In another example, either or both of the channels may be substantially angled relative to the longitudinal axis X. Either or both of the channels may have a starting point defined in the first and/or second ends of the control module 202. Alternatively, either or both of the channels may have a starting point in the first end 226 of the module 202. In FIG. 2, for example, the first channel 208 has a starting point defined in the first side 230 of the module 202 and the second channel 210 has a starting point defined in the second side 232 thereof.

Figure 4:
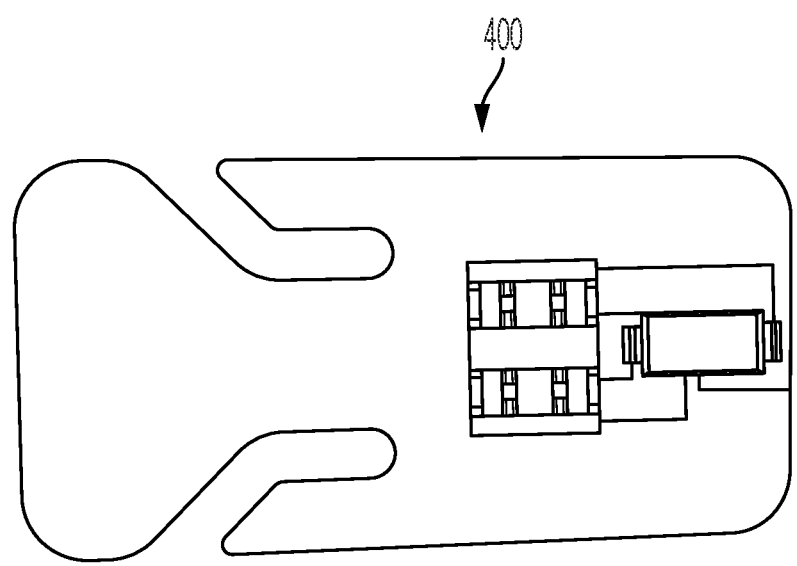
FIG. 4 is a perspective view of another embodiment of a control module assembly.

In FIG. 4, another embodiment of a control module assembly 400 is shown. The control module assembly of FIGS. 2-4 are designed to intercept an electronic signal and control a desired response. For example, the module assembly 400 may be utilized to intercept a fog or secondary lamp and a high beam control signal, thereby allowing the fog or secondary lamp to be simultaneously illuminated or activated when the high beam control signal is received. For example, when a driver enables a control from within a cab of the vehicle 100 to switch the high beam on, this signal from the control may be intercepted by the control module assembly 400 such that both the high beam of the headlamp 114 and the fog lamp 116 are activated and illuminated at the same time. Moreover, the high beam, low beam and fog light may be activated simultaneously via the control module assembly 400 of the present disclosure. When the low beam is active and the high beam is disabled, the low beam and fog lamps may function normally.

Figure 5:
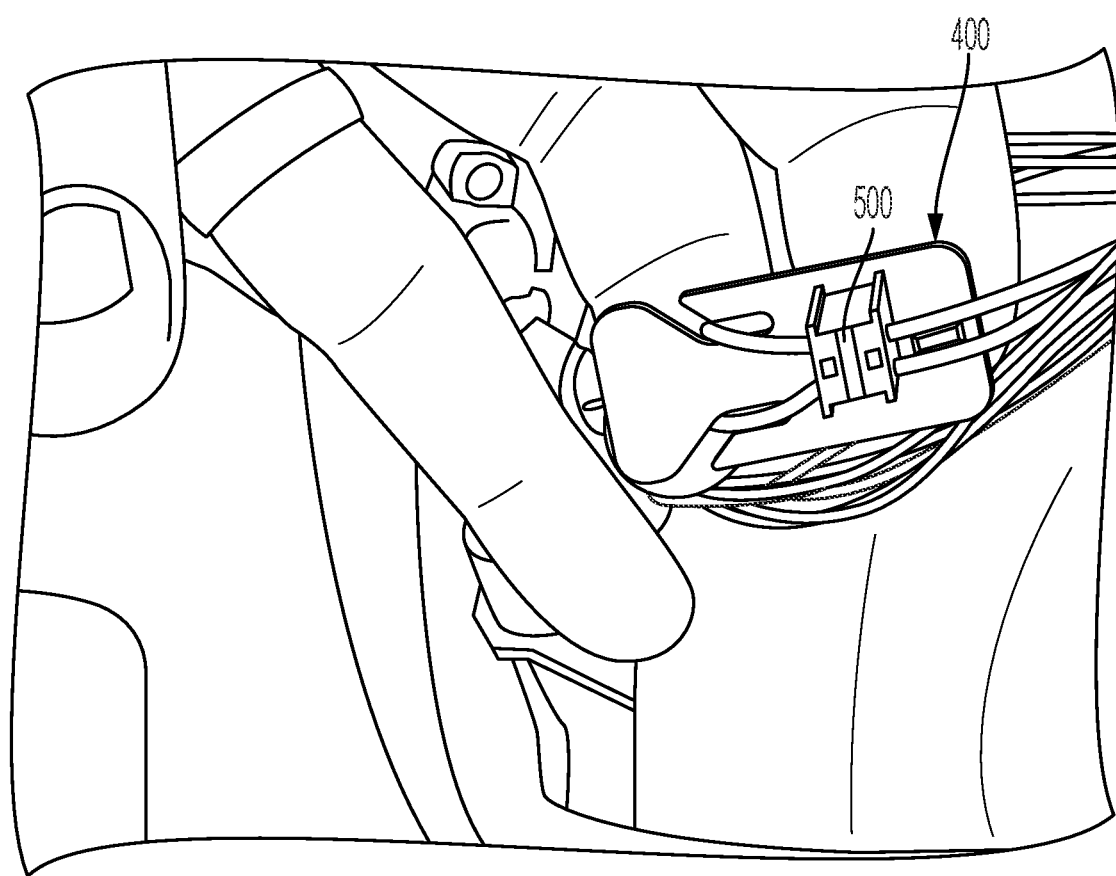
FIG. 5 illustrates the control module assembly of FIG. 4 connected to a pair of wires.
Figure 6:
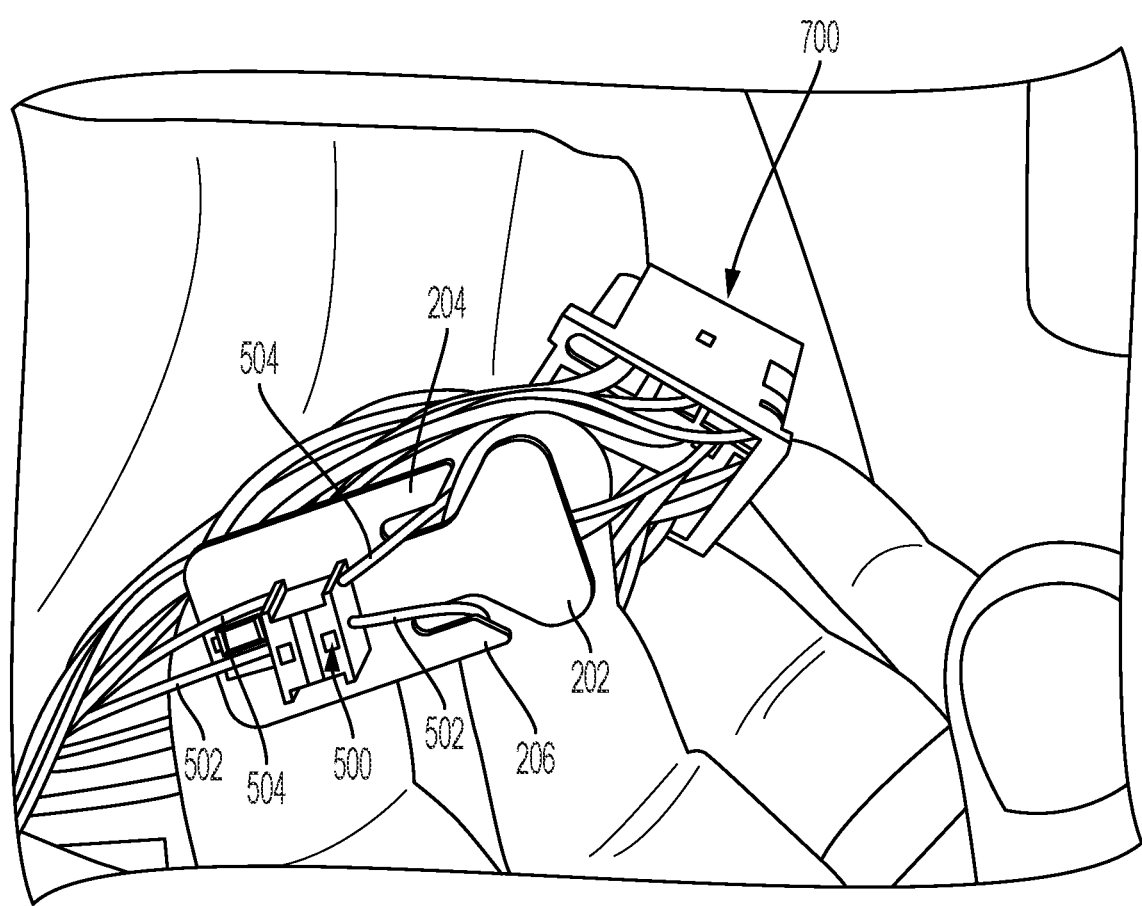
FIG. 6 illustrates another view of the control module assembly of FIG. 4 connected to a pair of wires.
Figure 7:
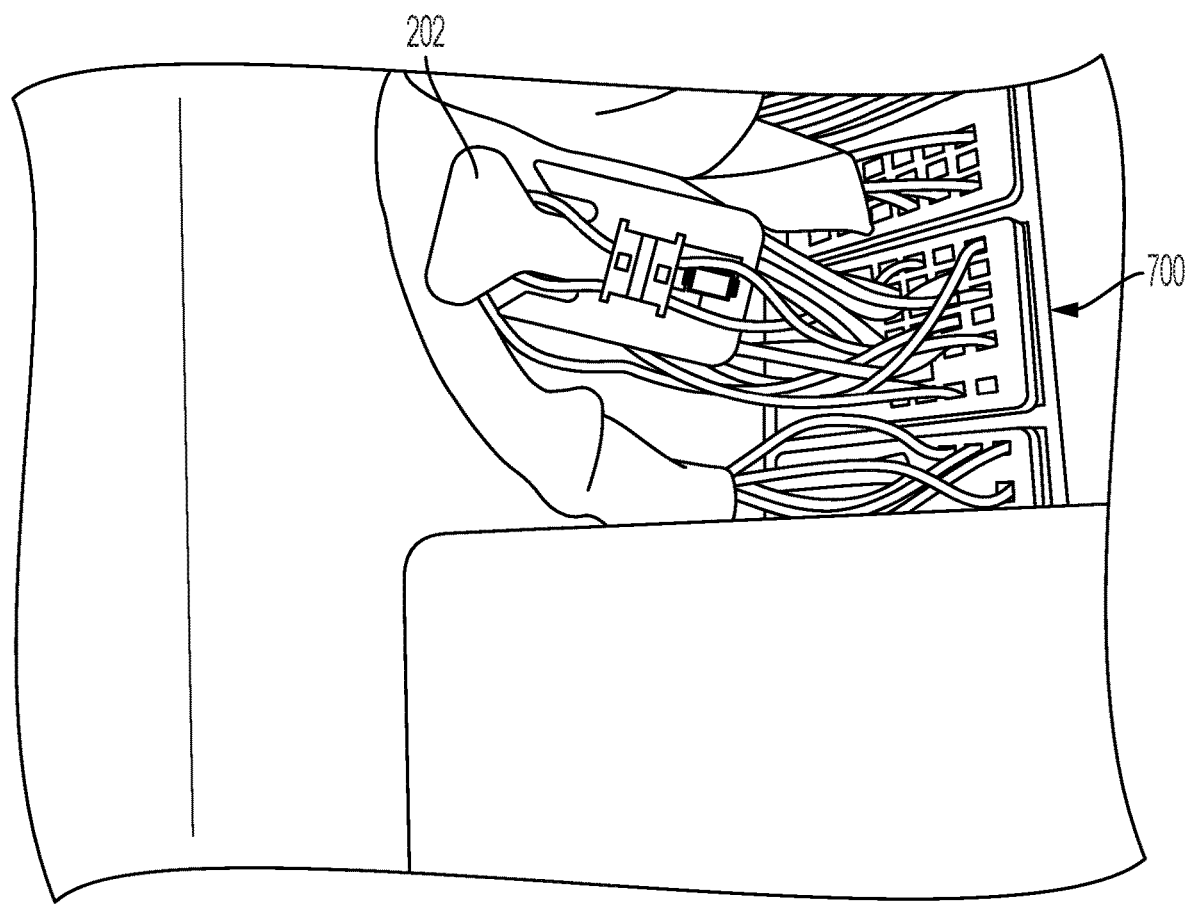
FIG. 7 illustrates a further view of the control module assembly of FIG. 4 connected to a pair of wires in a fuse box of a vehicle.

In FIGS. 5-7, the control module assembly 400 is shown with wires 502, 504 for the fog lights and high beams, respectively, being interconnected to the diode assembly 212. The wires 502, 504 may be part of a wiring harness 700 as shown in FIGS. 6 and 7. In effect, the wiring harness may include wires which trigger or control relays in a fuse box 118 located on the vehicle 100 for operating the different lamps.

Moreover, as shown in FIGS. 5 and 6, a cover or cap 500 may couple to the connector assembly 214 to substantially enclose the wires within. The cover or cap 500 further retains the wires 502, 504 within the connector assembly 214. Further, the cover or cap 500 may apply an additional force against the wires 502, 504 to further strip or cut the outer layers thereof by one or more wire strippers 224. As shown in FIGS. 2-3, the one or more wire cutting mechanisms 224 may be coupled to the body 216 of the connector assembly 214. More specifically, the wire cutting mechanisms 224 may partially form the aforementioned wire guides. The wire cutting mechanisms 224 include a sharpened or angled blade or edge for cutting through or displacing an outer layer of the wires. The wire cutting mechanisms 224 may be formed of a conductive material through which electrical power can be transferred from the wires 502, 504 to the diode assembly 212 via the circuitry 222.

In accordance with the present disclosure, a method of assembly is also contemplated. Here, a user may access the different wires 502, 504 for controlling the high beam and fog lights, for example, in a wiring harness 700 of a motorized vehicle 100. Upon locating the pair of wires, the user may feed a first wire 502 into the first channel 208 of the control module assembly 200. In particular, the wire 502 may be fed through the first angled portion 308 and then into the second, straight portion 310 until the wire reaches the end of the channel 208. The second wire 504 may then be fed into the second channel 210. More specifically, the second wire 504 may be fed into the first angled portion 312 of the channel 210 and then into the second portion 314 thereof.

Once the wires 502, 504 are disposed within the respective channels, the first wire 502 may be positioned within the first wire receiver 218 of the connector assembly 214. As this happens, the first wire 502 may be pushed into contact with the first and second wire guides 304, 306. The same may be done with the second wire 504 where it is positioned within the second wire receiver 220 and pushed into contact with the first and second wire guides 304, 306 thereof. Once the first and second wires 502, 504 are located within the first and second channels 208, 210 and the first and second wire receivers 218, 220, the cover or cap 500 of the connector assembly 214 may be coupled thereto. In one instance, the cover or cap 500 may snap into connection with the connector body 216. In another example, the cover or cap 500 may clip or mechanically fasten according to another conventionally known manner.

As the cover or cap 500 is coupled to the connector body 216, the outer layer or layers of the first and second wires 502, 504 may be cut or displaced between the wire cutting mechanisms 224 in order to electrically couple the wires 502, 504 to the diode assembly 212 of the control board assembly 200, 400.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A multi-light control module assembly for controlling multiple lamps on a motorized vehicle, comprising:
   a circuit board module comprising a first end, a second end, a first side, and a second side, where the board comprises a length defined between the first end and the second end and a width defined between the first side and the second side;
   a diode assembly coupled to the circuit board module at a location generally towards the second end thereof;
   a connector assembly coupled to the circuit board module adjacent to the diode assembly, the connector assembly being electrically coupled to the diode assembly;
   a first channel defined between a first arm and a main portion of the circuit board module;
   a second channel defined between a second arm and the main portion of the circuit board module; and
   a cap removably coupled to the connector assembly configured for partially housing a pair of wires receiving in the connector assembly;
   wherein, the connector assembly comprises a first wire receiver and a second wire receiver, the first wire receiver including at least one wire guide and the second wire receiver including at least one wire guide;
   wherein, the first wire receiver comprises a first wire cutting mechanism and the second wire receiver comprises a second wire cutting mechanism.

2. The control module assembly of claim 1, wherein the first channel is located adjacent to the first side and the second channel is located adjacent to the second side.

3. The control module assembly of claim 1, wherein neither the first channel or second channel is formed in either the first end or second end of the circuit board module.

4. The control module assembly of claim 1, wherein each of the first and second channels comprises a substantially angled portion and a substantially straight portion.

5. The control module assembly of claim 4, wherein the substantially angled portion is formed in the respective first or second side.

6. The control module assembly of claim 1, wherein:
   the length of the circuit board module is defined along a longitudinal axis;
   the first channel comprises a first portion angled relative to the longitudinal axis at a first angle;
   the second channel comprises a second portion angled relative to the longitudinal axis at a second angle, where the second angle is about the same as the first angle.

7. The control module assembly of claim 1, wherein the first arm is formed at the first side of the circuit board module and the second arm is formed at the second side thereof.

8. The control module assembly of claim 1, wherein the circuit board module comprises a thickness which is less than the length and width.

9. The control module assembly of claim 1, further comprising circuitry electrically coupling the connector assembly and the diode assembly to one another.

10. A control module assembly for controlling two or more lamps on a motorized vehicle, comprising:
    a circuit board module comprising a first end, a second end, a first side, and a second side;
    a diode assembly coupled to the circuit board module towards the second end thereof;
    a connector assembly coupled to the circuit board module;
    a first channel defined between a first arm and a main portion of the circuit board module;
    a second channel defined between a second arm and the main portion of the circuit board module; and
    circuitry coupled to the circuit board module at least partially between the connector assembly and the diode assembly, the circuitry electrically coupling the connector assembly to the diode assembly;
    wherein, the connector assembly comprises a wire receiver including at least one wire guide;
    wherein, the at least one wire guide is formed via a wire cutting mechanism.

11. The control module assembly of claim 10, further comprising a cap removably coupled to the connector assembly configured for partially housing one or more wires received by the connector assembly.

12. The control module assembly of claim 10, wherein the first channel is located adjacent to the first side and the second channel is located adjacent to the second side.

13. The control module assembly of claim 10, wherein each of the first and second channels comprises a substantially angled portion and a substantially straight portion.

14. The control module assembly of claim 10, wherein:
    the length of the circuit board module is defined along a longitudinal axis;
    the first channel comprises a first portion angled relative to the longitudinal axis at a first angle;

the second channel comprises a second portion angled relative to the longitudinal axis at a second angle, where the second angle is about the same as the first angle.

15. The control module assembly of claim 10, wherein the first arm is formed at the first side of the circuit board module and the second arm is formed at the second side thereof.

16. A motorized vehicle, comprising:
a chassis;
a plurality of wheels for supporting the chassis;
a vehicle lighting system comprising at least one headlamp and at least one fog lamp, where the at least one headlamp is configured to emit a high light beam, a low light beam, or both, and the at least one fog lamp is configured to emit a fog light beam;
a first wire disposed in communication with the at least one headlamp;
a second wire disposed in communication with the at least one fog lamp; and
a control module assembly for controlling the at least one headlamp to emit the high light beam and the at least one fog lamp to emit a fog light beam simultaneously, the control module assembly comprising:
a circuit board module comprising a first end, a second end, a first side, and a second side;
a diode assembly coupled to the circuit board module;
a connector assembly coupled to the circuit board module adjacent to the diode assembly, the connector assembly being electrically coupled to the diode assembly;
a first channel defined between a first arm and a main portion of the circuit board module;
a second channel defined between a second arm and the main portion of the circuit board module; and
a cap removably coupled to the connector assembly for partially housing the first and second wires in the connector assembly;

wherein, the connector assembly comprises a first wire receiver and a second wire receiver, the first wire receiver including at least one wire guide and the second wire receiver including at least one wire guide;

wherein, the first wire is received by the first wire receiver and the second wire is received by the second wire receiver.

17. The motorized vehicle of claim 16, wherein the first wire receiver comprises a first wire cutting mechanism and the second wire receiver comprises a second wire cutting mechanism, the first wire cutting mechanism partially cutting through an outer layer of the first wire and the second wire cutting mechanism partially cutting through an outer layer of the second wire.

18. The motorized vehicle of claim 16, further comprising a wiring harness including the first and second wires located on the vehicle, the control module assembly being coupled into the wiring harness.

19. The motorized vehicle of claim 16, further comprising circuitry electrically coupling the connector assembly and the diode assembly to one another, the circuitry comprising a first wire circuit and a second wire circuit;
wherein, when the first wire is located in the first wire receiver, the first wire circuit electrically couples the diode assembly to the first wire;
wherein, when the second wire is located in the second wire receiver, the second wire circuit electrically couples the diode assembly to the second wire.

20. The motorized vehicle of claim 16, wherein as the cap is coupled to the connector assembly with the first wire located in the first wire receiver and the second wire located in the second wire receiver, the cap forces the wires into contact with wire cutting mechanisms for electrically coupling the first and second wires to the diode assembly.

* * * * *